Patented Apr. 27, 1954

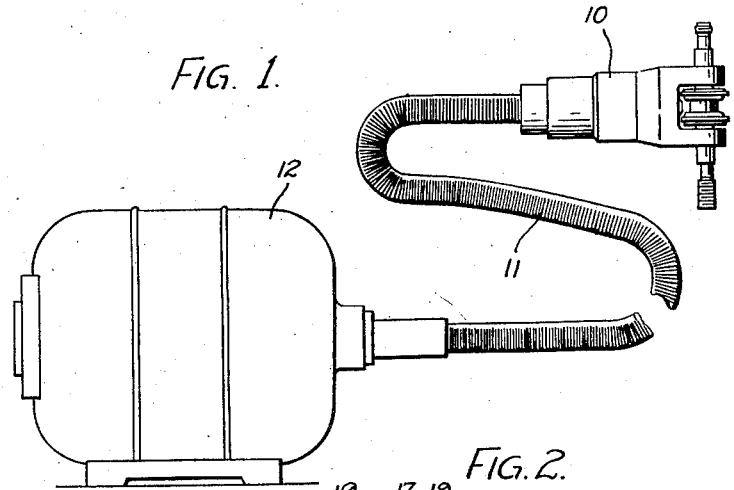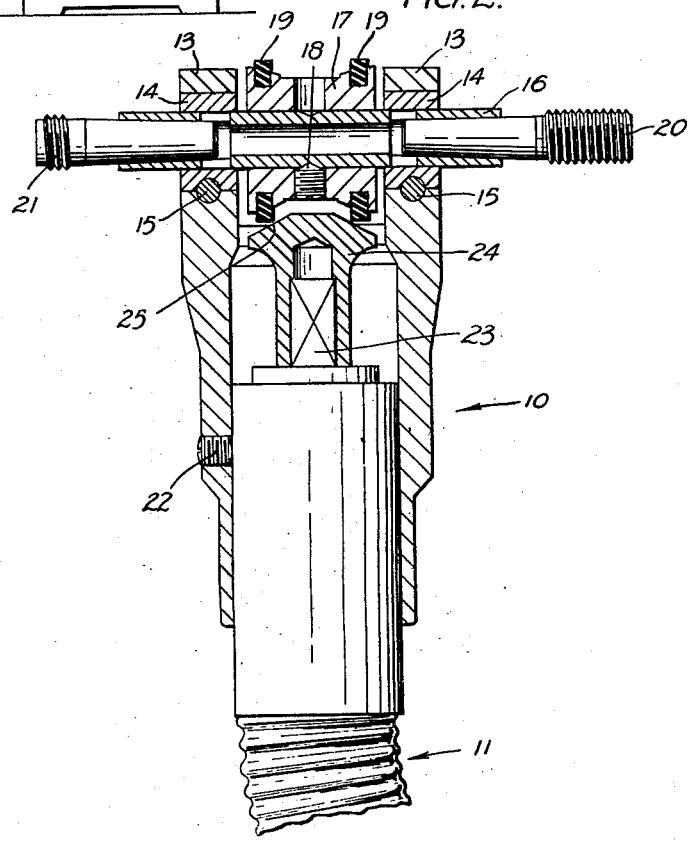

2,676,493

UNITED STATES PATENT OFFICE 2,676,493

GAUGING DEVICE

Horace William Mander, Kenilworth, England

Application November 29, 1951, Serial No. 258,800

Claims priority, application Great Britain
December 15, 1950

1 Claim. (Cl. 74—202)

This invention relates to gauging devices, and especially, though not exclusively, to devices for gauging screw threads, the invention having for its object to provide a gauging device which enables parts to be gauged quickly and easily.

A gauging device according to the invention comprises a head supporting a rotatable driving member having a frusto-conical surface, and a spindle mounted in said head for rotation about an axis in the same plane as, and perpendicular to, that of the driving member, the spindle, which is slidable in the direction of its axis, carrying two friction rings which are respectively engaged with the frusto-conical surface of the driving member on opposite sides of the centre thereof, to rotate the spindle in opposite directions by sliding the spindle in opposite directions, the said spindle being adapted to support a screw, plug or like gauge at at least one end.

The spindle may be adapted to support a gauge at each end, for example a "go" gauge at one end and a "not go" gauge at the other.

The invention is hereinafter described with reference to the accompanying drawings, in which:

Figure 1 shows one form of gauging device according to the invention, the head being connected by a flexible driving shaft to an electric motor;

Figure 2 is a sectional elevation of the head shown in Figure 1.

Referring to the drawings, a head 10 is mounted, as shown in Figure 1, on one end of a flexible driving shaft 11, the other end of which is connected to a rotary motor such as an electric motor 12.

The head 10 is tubular in form as shown in Figure 2, having two diametrally opposed ears 13 projecting longitudinally from one end. Each of the ears 13 is apertured to receive a bush 14, held in place by a dowel 15, the bushes having aligned holes to provide bearings for a spindle 16 the axis of which is in the same plane as, but perpendicular to, that of the head 10. Mounted on the spindle 16 between the ears 13 is a spool-like member 17, held in position by a grub-screw 18, the member 17 having a circumferential groove adjacent each end to receive a friction ring 19, which may be made of rubber. The length of the spool-like member 17 is less than the distance between the ears 13, so that the spindle is capable of limited endwise movement. The spindle 16 is tubular, and is tapered internally at each end to receive the tapered shank of a screw gauge, the gauges which are "go" and "not go" gauges for the same size of thread, being shown at 20 and 21 respectively.

The head is secured to the outer member of the flexible driving shaft 11 by a grub-screw 22. The inner member of the flexible driving shaft has mounted on its squared end 23 a driving member 24 having a frusto-conical driving surface 25 so positioned that, when the spool-like member 17 is centrally located between the ears, the two friction rings 19 are both slightly spaced from the said surface 25, as shown in Figure 2, but movement of the member 17 in one direction will bring one of the friction rings into contact with the said surface 25, and movement of the member 17 in the other direction will bring the other friction ring into contact with that surface. Thus the spindle is rotated by the frictional engagement of one or other friction ring 19 with the surface 25, in one direction if one friction ring is engaged, and in the other direction if the other friction ring is engaged.

In use, the head is brought up to the work with the gauge axis aligned with that of the hole in which the screw-thread to be gauged is formed, and with the driving member rotating. The "go" gauge is first presented to the work, the spindle being urged axially by the resistance to entry of the gauge, so that the gauge is rotated by engagement of one of the friction rings 19 with the driving member, in a direction to engage it with the screw thread being tested. If the thread is insufficiently cut, the gauge will not, of course enter, but if the thread is finished it will enter, and can be withdrawn merely by drawing the head away from the work, which will displace the spindle 16 axially and so reverse the rotation of the gauge. If the gauge will not enter, the drive will slip. The "not-go" gauge is used in a similar manner. The device may obviously be used with gauges for external screw threads or with plug or other gauges.

The head, instead of being adapted for mounting on a flexible driving shaft, may incorporate an electric or fluid pressure motor for actuating the driving member, the motor being connected to an electric supply or source of fluid pressure by a cable or flexible conduit.

I claim:

Reversible friction drive means comprising, in combination, a body, a driving member mounted in said body, a driving spindle carrying said driving member, means for adjustably positioning said driving spindle in said body in an axial direction, a frusto-conical surface on said driving member, a driven spindle rotatably and slidably mounted in said body, the axis of the driven spindle being in the same plane as, and perpendicular to, the axis of the driving spindle, a spool-like driven member mounted on the driven spindle, a grub screw securing said driven member to the driven spindle, axially spaced circumferential grooves in said driven member, and a pair of friction rings mounted one in each of said grooves, said friction rings being located one in each side of the axis of the driving member and being selectively brought into engagement with the frusto-conical surface on the driving member by opposite axial displacements of the driven spindle.

References Cited in the file of this patent

UNITED STATES PATENTS

| Number | Name | Date |
|---|---|---|
| 449,848 | Gibson | Apr. 7, 1891 |
| 1,071,216 | Dilg | Aug. 26, 1913 |
| 1,153,311 | Johnson | Sept. 14, 1915 |
| 1,525,134 | Hubbell | Feb. 3, 1925 |
| 1,711,179 | Scholz | Apr. 30, 1929 |
| 1,880,405 | Broecker | Oct. 4, 1932 |
| 2,602,347 | Miller | July 8, 1952 |

FOREIGN PATENTS

| Number | Country | Date |
|---|---|---|
| 104,850 | Great Britain | Mar. 22, 1917 |
| 428,290 | France | June 17, 1911 |